(12) United States Patent
Dolle et al.

(10) Patent No.: US 6,759,500 B1
(45) Date of Patent: Jul. 6, 2004

(54) HIGH-MOLECULAR POLYPROPYLENE WITH A BROAD DISTRIBUTION OF THE MOLECULAR WEIGHT AND A SHORT ISOTACTIC SEQUENCE LENGTH

(75) Inventors: Volker Dolle, Bensheim (DE); Volker Fraaije, Frankfurt (DE); Herbert Terwyen, Frankfurt (DE); Thomas Boehm, Darmstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/130,045

(22) PCT Filed: Nov. 15, 2000

(86) PCT No.: PCT/EP00/11278

§ 371 (c)(1),
(2), (4) Date: May 13, 2002

(87) PCT Pub. No.: WO01/40327

PCT Pub. Date: Jun. 7, 2001

(30) Foreign Application Priority Data

Nov. 29, 1999 (DE) .......................................... 199 57 384

(51) Int. Cl.⁷ ........................ C08F 110/06; C08F 210/06
(52) U.S. Cl. ........................ 526/351; 526/348; 526/65; 526/160; 525/53; 525/240
(58) Field of Search ........................ 526/65, 348, 351; 525/53, 240

(56) References Cited

U.S. PATENT DOCUMENTS

| | | | |
|---|---|---|---|
| 4,794,096 A | 12/1988 | Ewen | 502/117 |
| 5,371,260 A | 12/1994 | Sangokoya | 556/171 |
| 5,391,793 A | 2/1995 | Marks et al. | 556/179 |
| 5,536,789 A | 7/1996 | Schwager et al. | 525/322 |
| 5,962,595 A | * 10/1999 | Dolle et al. | 525/322 |
| 6,130,180 A | 10/2000 | Stewart et al. | 502/124 |

FOREIGN PATENT DOCUMENTS

| | | |
|---|---|---|
| CA | 2 246 360 | 8/1997 |
| DE | 40 19 053 | 12/1991 |
| DE | 41 25 135 | 2/1993 |
| DE | 196 06 167 | 8/1997 |
| DE | 196 21 022 | 11/1997 |
| EP | 284 708 | 10/1988 |
| EP | 0 621 279 | 10/1994 |
| EP | 0 633 264 | 1/1995 |
| EP | 0 926 164 | 6/1999 |
| WO | WO 94/28034 | 12/1994 |

OTHER PUBLICATIONS

Wild et al. "Synthesis and Crystal Structure of a Chiral ansa Zirconocene Derivative with Ethylene–Bridged Tetrahydroindenyl Ligands" Jnl. of Organometallic Chemistry vol. 288 (1985) pp. 63–67.

Zambelli et al. "Model Compounds and $^{13}C$ NMR Observation of Stereosequences of Polypropylene" Macromolecules vol. 8, No. 5 (1975) pp. 687–688.

* cited by examiner

*Primary Examiner*—Roberto Rabago
(74) *Attorney, Agent, or Firm*—Keil & Weinkauf

(57) ABSTRACT

Propylene polymers containing from 0 to 2.5% by weight of $C_2$–$C_{10}$-olefin comonomers have an $M_w$ of from 350,000 to 1,000,000 g/mol, an $M_w/M_n$ of from 4 to 10, a proportion by weight of the polymer fraction having a viscosity number of from 500 to 1400 ml/g of from 20 to 80% of the total polymer and a proportion by weight of a polymer fraction having a viscosity number of from 200 to 400 ml/g of from 80 to 20% of the total polymer and an isotactic sequence length of from 50 to 100.

8 Claims, No Drawings

HIGH-MOLECULAR POLYPROPYLENE WITH A BROAD DISTRIBUTION OF THE MOLECULAR WEIGHT AND A SHORT ISOTACTIC SEQUENCE LENGTH

The present invention relates to propylene polymers containing from 0 to 2.5% by weight of $C_2$–$C_{10}$-olefin comonomers and having an $M_w$ of from 350,000 to 1,000,000 g/mol, an $M_w/M_n$ of from 4 to 10, a proportion by weight of the polymer fraction having a viscosity number of from 500 to 1400 ml/g of from 20 to 80% of the total polymer and a proportion by weight of a polymer fraction having a viscosity number of from 200 to 400 ml/g, of from 80 to 20% of the total polymer and an isotactic sequence length of from 50 to 100.

The present invention further relates to the use of such propylene polymers (hereinafter referred to as "propylene polymers of the present invention") for producing fibers, films and moldings, in particular for producing tubes having a high creep rupture strength under internal pressure (creep rupture strength hereinafter referred to as "CRS"), the fibers, films and moldings, in particular the tubes having a high CRS, made from the propylene polymers of the present invention and the use of the moldings, in particular the tubes having a high CRS, in the construction of chemical apparatus, as drinking water pipe and as wastewater pipe.

High molecular weight propylene polymers can be prepared using conventional Ziegler catalysts based on a titanium compound/an aluminum alkyl, as is described, for example, in DE-A 40 19 053. The expression "high molecular weight propylene polymers" usually refers to propylene polymers which have a molecular weight $M_w$ measured by GPC (gel permeation chromatography) of more than about 500,000 g/mol and a corresponding melt flow rate at 230° C. under a load of 5 kg (MFR 230/5, measured in accordance with ISO 1133) of at least about 3 dg/min. In contrast thereto, customary propylene polymers have an $M_w$ of from about 100,000 g/mol to about 300,000 g/mol and correspondingly an MFR (230/5) of more than 4 dg/min.

The high molecular weight propylene polymers obtainable using Ziegler catalysts (hereinafter referred to as "high molecular weight Ziegler propylene polymers") generally have a large mean length of isotactic sequences "n-iso", (measured using the $^{13}$C-NMR method as described by zambelli et al. Macromolecules 8, 687–689(1975); the value is usually over 100. Further properties of such high molecular weight Ziegler propylene polymers are a comparatively high proportion of xylene-soluble substances "XS value" (XS value determined as described in the examples) and a comparatively high melting point of generally more than 160° C. (determined by the DSC method, as described in the examples). When processed, for example by extrusion, to produce shaped articles such as tubes, etc., such high molecular weight Ziegler propylene polymers display poor processability (in particular poor flow) and the articles produced often have poor organoleptic properties (odor, taste). The unsatisfactory organoleptic properties are caused, on the basis of present-day knowledge, by low molecular weight, oily propylene oligomers.

Attempts are usually made to circumvent the unsatisfactory processability of the high molecular weight Ziegler propylene (homo)polymers by changing to high molecular weight Ziegler propylene-olefin copolymers which have a lower melting point and therefore flow more readily at a given temperature during extrusion than do the analogous homopolymers. However, the copolymers have an increased content of readily soluble propylene oligomers, again resulting in high proportions of xylene-soluble material and unfavorable organoleptic properties of the high molecular weight Ziegler propylene copolymers.

In addition, the tubes produced from high molecular weight Ziegler propylene polymers, for example as described in DE-A 40 19 053, have high brittleness (low CRS) and a rough (internal) surface. The rough surface provides, on the basis of present-day knowledge, a large surface area for attack by liquids, and the liquids leach out the polymer stabilizer present in the tube, which once again reduces the CRS of the tubes.

It is an object of the present invention to find propylene polymers which can easily be processed (inter alia due to improved flow) by means of conventional manufacturing tools to give shaped bodies, in particular tubes, which have not only low brittleness and a smooth surface but also a high toughness and good stiffness combined with a good CRS of the shaped bodies, in particular tubes.

We have found that this object is achieved by the propylene polymers of the present invention, the use of such propylene polymers for producing fibers, films and moldings, the fibers, films and moldings made of the propylene polymers of the present invention and the use of the tubes in the construction of chemical apparatus, as drinking water pipes and as wastewater pipes.

The propylene polymers of the present invention are generally obtained by means of at least two-stage polymerization (known as the cascade method) of propylene together with from 0 to 2.5% by weight of $C_2$–$C_{10}$-olefin comonomers, preferably from 0 to 1.5% by weight of $C_2$–$C_{10}$-olefin comonomers and in particular from 0 to 1% by weight of $C_2$–$C_{10}$-olefin comonomers, in the presence of metallocene catalyst systems (as described below).

Suitable $C_2$–$C_{10}$-olefin comonomers are ethylene, 1-butene, 1-pentene, 1-hexene, 1-heptene, 1-octene, 1-nonene and 1-decene. It is possible to copolymerize a plurality of comonomers or only one comonomer with the propylene. The abovementioned % by weight are then based on the sum of the comonomers. Preferred $C_2$–$C_{10}$-olefin comonomers are ethylene, 1-butene and 1-hexene. Preferred propylene-olefin copolymers are propylene-ethylene copolymers, propylene-1-butene copolymers and propylene-ethylene-1-butene terpolymers. The total amount of comonomers in these cases, too, is in the range from 0.1 to 2.5% by weight, preferably in the range from 0.1 to 1.5% by weight, in particular in the range from 0.1 to 1% by weight.

The polymerization reactions, generally at least two-stage reactions, can essentially be carried out continuously or batchwise by all suitable olefin polymerization methods. They can be carried out in the gas phase, for example in a fluidized-bed reactor or a stirred gas phase, in the liquid monomers, in solution or in suspension in suitable reaction vessels or in loop reactors. The polymerization temperature is usually in the range from 0 to 150° C., preferably in the range from 30 to 100° C., the pressure is in the range from 5 to 500 bar, preferably from 10 to 100 bar, and the mean residence time is in the range from 0.5 hour to 6 hours, preferably from 0.5 to 4 hours.

A well-suited polymerization method is the two-stage bulk polymerization process.

Here, a high molecular weight propylene homopolymer or copolymer of the composition described above, preferably a propylene homopolymer, having a viscosity of from 500 to 1400 ml/g (determined by the method disclosed in the examples) and a proportion of the total polymer of from 20 to 80% by weight, preferably from 45 to 75% by weight, particularly preferably from 48 to 65% by weight, is prepared in the first reaction step, while in the second, usually downstream reaction step, a low molecular weight propylene homopolymer or copolymer of the composition described above, preferably a propylene homopolymer, having a viscosity of from 200 to 400 ml/g and a proportion of from 20 to 80% by weight, preferably from 25 to 55% by weight, particularly preferably from 35 to 52% by weight, is prepared.

The first and second reaction steps can be carried out batchwise or continuously. Preference is given to continuous operation. The first polymerization step is generally carried out in liquid propylene at from 55 to 100° C. and a residence time of from 0.5 to 3.5 hours. A phase ratio in the range from 2.5 to 4 l of liquid propylene per kg of PP, preferably 3.3 l of liquid propylene per kg of PP, is usually set. To regulate the molar mass, hydrogen is generally metered in.

After the first reaction step, the multiphase system is generally transferred to the second reaction step and polymerized there at from 55 to 100° C. The second reaction step generally takes place in a second reactor. There, a phase ratio of from 1 to 2.5 l of liquid propylene per kg of PP, preferably 1.9 l of liquid propylene per kg of PP, is usually set.

According to the present invention, different phase ratios are preferably set in the two reactors in the process described here. Ethylene and hydrogen are likewise metered in, as described above.

The temperatures and hydrogen concentrations in the two reactors may be identical or different. Suitable reactors are stirred vessels or loop reactors.

It is possible to depressurize the monomer between the two reactors and to introduce the still polymerization-active catalyst/polymer system into the second reactor. In the second reactor, it is possible to set a lower hydrogen concentration than in the first reactor.

The propylene polymers of the present invention have a mean molecular weight $M_w$ (determined by gel permeation chromatography at 135° C. in 1,3,4-trichlorobenzene as solvent using a PP standard) of from 350,000 g/mol to 1,000,000 g/mol, preferably from 350,000 g/mol to 800,000 g/mol and in particular from 400,000 to 650,000 g/mol.

The molecular weight distribution $M_w/M_n$ (determined by gel permeation chromatography at 135° C. in 1,3,4-trichlorobenzene as solvent using a PP standard) of the propylene polymers of the present invention is in the range from 4 to 10, preferably in the range from 4 to 8.

The isotactic sequence length n-iso of the propylene polymers of the present invention (determined as described at the outset) is in the range from 50 to 100, preferably in the range from 55 to 95 and in particular in the range from 60 to 90.

According to the present invention, preference is given to products having an MFR (230/5), determined in accordance with ISO 1133, of from 0.01 to 5 dg/min, particularly preferably from 0.02 to 2 dg/min.

The propylene polymers of the present invention having the composition as described above can be fractionated by customary methods of polymer fractionation to give at least two fractions which have different viscosities, viz. molecular weights $M_w$. The high molecular weight fraction of the propylene homopolymer or copolymer, preferably propylene homopolymer, of the present invention generally has a viscosity (=VN) of from 500 to 1400 ml/g (determined by the method disclosed in the examples) and a proportion of the total polymer of from 20 to 80% by weight, preferably from 45 to 75% by weight, particularly preferably from 48 to 65% by weight.

The low molecular weight fraction of the propylene homopolymer or copolymer, preferably propylene homopolymer, of the present invention generally has a viscosity VN of from 200 to 400 ml/g and a proportion of the total polymer of from 20 to 80% by weight, preferably from 25 to 55% by weight, particularly preferably from 35 to 52% by weight.

On the basis of present-day knowledge, this narrow weight distribution spectrum of the different fractions of the propylene polymers of the present invention makes a large contribution to the improved properties (especially the CRS) of the fibers, films and especially moldings (e.g. tubes) which can be produced from the propylene polymers of the present invention.

The propylene polymer of the present invention obtained after the polymerization reaction is usually admixed with stabilizers, lubricants, fillers, pigments, etc., and granulated.

The polymerization of the propylene, if desired together with the comonomers described, takes place, preferably in the processes described, in the presence of metallocene catalyst systems. The metallocene catalyst systems usually comprise a metallocene component A), a cocatalyst (also known as activator) B) and, if desired, support materials C) and/or organometallic compounds D) as scavengers.

As metallocene component A) of the metallocene catalyst system, it is in principle possible to use any metallocene which, under the specified polymerization conditions, produces isotactic polypropylene having a sufficiently high molar mass, i.e. an $M_w$ of generally greater than 350,000 g/mol, and a sufficiently high melting point, i.e. generally greater than 150° C.

The metallocene can be either bridged or unbridged and have identical or different ligands. Preference is given to metallocones of groups IVb of the Periodic Table of the Elements, namely of titanium, zirconium or hafnium.

It is of course also possible to employ mixtures of different metallocenes as component A).

Well-suited metallocene components A) are those described, for example, in DE-A 196 06 167, which is hereby expressly incorporated by reference. Particular mention may be made of the disclosure on page 3, line 28 to page 6, line 48 of DE-A 196 06 167.

Preferred metallocene components A) are those of the formula (I) below

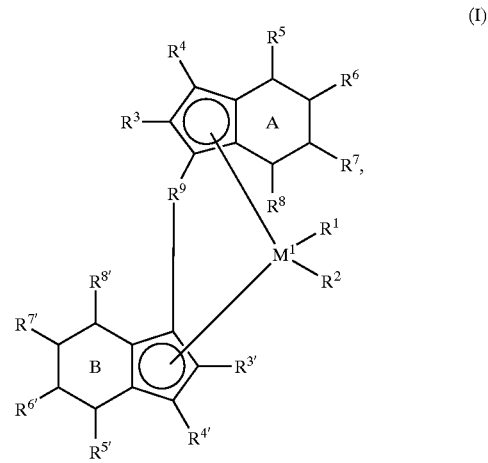

(I)

where
$M^1$ is a metal of group IVb of the Periodic Table of the Elements,
$R^1$ and $R^2$ are identical or different and are each a hydrogen atom, $C_1$–$C_{10}$-alkyl group, a $C_1$–$C_{10}$-alkoxy group, a $C_6$–$C_{20}$-aryl group, a $C_6$–$C_{10}$-aryloxy group, a $C_2$–$C_{10}$-alkenyl group, an OH group, an $NR^{12}_2$ group, where $R^{12}$ is a $C_1$–$C_2$-alkyl group or a $C_6$–$C_{14}$-aryl group, or a halogen atom, $R^3$ to $R^8$ and $R^{3'}$ to $R^{8'}$ are identical or different and are each a hydrogen atom, a $C_1$–$C_{40}$-hydrocarbon group which may be linear, cyclic or branched, e.g. a $C_1$–$C_{10}$-alkyl group, a $C_2$–$C_{10}$-alkenyl group, a $C_6$–$C_{20}$-aryl group, a $C_7$–$C_{40}$-arylalkyl group, a $C_7$–$C_{40}$-alkylaryl group or a $C_8$–$C_{40}$-arylalkenyl group, or adjacent radicals $R^4$ to $R^8$ and/or $R^{4'}$ to $R^{8'}$ together with the atoms connecting them form a ring system, $R^9$ is a bridge, preferably $$-O-\underset{R^{11}}{\overset{R^{10}}{M^2}}-O-, \quad -\underset{R^{11}}{\overset{R^{10}}{C}}-, \quad -O-\underset{R^{11}}{\overset{R^{10}}{M^2}}-,$$

$$-\underset{R^{11}}{\overset{R^{10}}{C}}-\underset{R^{11}}{\overset{R^{10}}{M^2}}-, \quad -\underset{R^{11}}{\overset{R^{10}}{M^2}}-, \quad -\underset{R^{11}}{\overset{R^{10}}{M^2}}-\underset{R^{11}}{\overset{R^{10}}{M^2}}-,$$

$$-\underset{R^{11}}{\overset{R^{10}}{C}}-\underset{R^{11}}{\overset{R^{10}}{C}}-, \quad -\underset{R^{11}}{\overset{R^{10}}{M^2}}-\left[\underset{R^{11}}{\overset{R^{10}}{C}}\right]_x\underset{R^{11}}{\overset{R^{10}}{M^2}}-,$$

$$-\underset{R^{11}}{\overset{R^{10}}{C}}-\underset{R^{11}}{\overset{R^{10}}{C}}-\underset{R^{11}}{\overset{R^{10}}{C}}-, \quad >BR^{10}, \quad >AlR^{10}, \quad -Ge-,$$

$$-O-, \quad -S-, \quad >SO, \quad >SO_2, \quad >NR^{10}, \quad >CO,$$

$$>PR^{10}, \text{ or } >P(O)R^{10}, \quad \text{where}$$

$R^{10}$ and $R^{11}$ are identical or different and are each a hydrogen atom, a halogen atom or a $C_1$–$C_{40}$ group such as a $C_1$–$C_{20}$-alkyl group, a $C_1$–$C_{10}$-fluoroalkyl group, a $C_1$–$C_{10}$-alkoxy group, a $C_6$–$C_{14}$-aryl group, a $C_6$–$C_{10}$-fluoroaryl group, a $C_6$–$C_{10}$-aryloxy group, a $C_2$–$C_{10}$-alkenyl group, a $C_7$–$C_{40}$-aralkyl group, a $C_7$–$C_{40}$-alkylaryl group or a $C_8$–$C_{10}$-arylalkenyl group or $R^{10}$ and $R^{11}$ together with the atoms connecting them form one or more rings and x is an integer from zero to 18, $M^2$ is silicon, germanium or tin, and the rings A and B are identical or different, saturated, unsaturated or partially saturated.

$R^9$ can also link two units of the formula I with one another.

In formula I, it is particularly preferred that $M^1$ is zirconium or hafnium, $R^1$ and $R^2$ are identical and are methyl or chlorine, in particular chlorine, and $R^9=M^2R^{10}R^{11}$, where $M^2$ is silicon or germanium and $R^{10}$ and $R^{11}$ are each a $C_1$–$C_{20}$-hydrocarbon group such as $C_1$–$C_{10}$-alkyl or $C_6$–$C_{14}$-aryl.

The indenyl or tetrahydroindenyl ligands of the metallocenes of the formula I are preferably substituted in the 2 position, 2,4 positions, 4,7 positions, 2,6 positions, 2,4,6 positions, 2,5,6 positions, 2,4,5,6 positions or 2,4,5,6,7 positions, in particular in the 2,4 positions. Preferred substituents are $C_1$–$C_4$-alkyl groups such as methyl, ethyl or isopropyl or $C_6$–$C_{20}$-aryl groups such as phenyl, naphthyl or mesityl. The 2 position is preferably substituted by a $C_1$–$C_4$-alkyl group such as methyl or ethyl. If the 2,4 positions are substituted, then $R^5$ and $R^{5'}$ are preferably identical or different and are each a $C_6$–$C_{10}$-aryl group, a $C_7$–$C_{10}$-arylalkyl group, a $C_7$–$C_{40}$-alkylaryl group or a $C_8$–$C_{40}$-arylalkenyl group.

The following nomenclature is employed for the site of substitution:

Further metallocenes of particular importance are those of the formula I in which the substituents in the 4 and 5 positions of the indenyl radicals ($R^5$ and $R^6$ or $R^{5'}$ and $R^{6'}$) together with the atoms connecting them form a ring system, preferably a six-membered ring. This fused-on ring system can likewise be substituted by radicals having the meanings of $R^3$–$R^8$. An example of such a compound I is dimethylsilanediylbis(2-methyl-4,5-benzoindenyl)zirconium dichloride.

Particular preference is given to compounds of the formula I which bear a $C_6$–$C_{20}$-aryl group in the 4 position and a $C_1$–$C_4$-alkyl group in the 2 position. An example of such a compound of the formula I is dimethylsilanediylbis(2-methyl-4-phenylindenyl)zirconium dichloride.

Examples of metallocene components A in the process of the present invention are:
dimethylsilanediylbis(indenyl)zirconium dichloride
dimethylsilanediylbis(4-naphthylindenyl)zirconium dichloride
dimethylsilanediylbis(2-methylbenzoindenyl)zirconium dichloride
dimethylsilanediylbis(2-methylindenyl)zirconium dichloride
dimethylsilanediylbis(2-methyl-4-(1-naphthyl)indenyl) zirconium dichloride
dimethylsilanediylbis(2-methyl-4-(2-naphthyl)indenyl) zirconium dichloride
dimethylsilanediylbis(2-methyl-4-phenylindenyl)zirconium dichloride
dimethylsilanediylbis(2-methyl-4-(p-tert-butylphenyl) indenyl)zirconium dichloride
dimethylsilanediylbis(2-methyl-4-t-butylindenylzirconium dichloride
dimethylsilanediylbis(2-methyl-4-isopropylindenyl) zirconium dichloride
dimethylsilanediylbis(2-methyl-4-ethylindenyl)zirconium dichloride
dimethylsilanediylbis (2-methyl-4-α-acenaphthindenyl) zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl-4-thylindenyl)zirconium dichloride
dimethylsilanediylbis(2-ethyl-4-phenylindenyl)zirconium dichloride
dimethylsilanediylbis(2-methyl-4,5-benzoindenyl) zirconium dichloride
dimethylsilanediylbis(2-methyl-4,6-diisopropylindenyl) zirconium dichloride
dimethylsilanediylbis(2-methyl-4,5-diisopropylindenyl) zirconium dichloride
dimethylsilanediylbis(2,4,6-trimethylindenyl)zirconium dichloride dimethylsilanediylbis(2,5,6-trimethylindenyl)zirconium dichloride
dimethylsilanediylbis(2,4,7-trimethylindenyl)zirconium dichloride
dimethylsilanediylbis(2-methyl-5-isobutylindenyl)zirconium dichloride
dimethylsilanediylbis(2-methyl-5-t-butylindenyl)zirconium dichloride
dimethylsilanediylbis(2-methyl-4-phenanthrylindene)zirconium dichloride
dimethylsilanediylbis(2-ethyl-4-phenanthrylindenyl)zirconium dichloride
methyl(phenyl)silanediylbis(2-methyl-4-phenylindenyl)zirconium dichloride
methyl(phenyl)silanediylbis(2-methyl-4,6-diisopropylindenyl)zirconium dichloride
methyl(phenyl)silanediylbis(2-methyl-4-isopropylindenyl)zirconium dichloride
methyl(phenyl)silanediylbis(2-methyl-4,5-benzoindenyl)zirconium dichloride
methyl(phenyl)silanediylbis(2-methyl-4,5-(methylbenzo)indenyl)zirconium dichloride
methyl(phenyl)silanediylbis(2-methyl-4,5-(tetramethylbenzo)-indenyl)zirconium dichloride
methyl(phenyl)silanediylbis(2-methyl-4-acenaphthindenyl)zirconium dichloride
methyl(phenyl)silanediylbis(2-methylindenyl)zirconium dichloride
methyl(phenyl)silanediylbis(2-methyl-5-isobutylindenyl)zirconium dichloride
methyl(phenyl)silanediylbis(2-methyl-4-phenanthrylindenyl)zirconium dichloride
methyl(phenyl)silanediylbis(2-ethyl-4-phenanthrylindenyl)zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6-diisopropylindenyl)zirconium dichloride
1,4-butanediylbis(2-methyl-4-isopropylindenyl)zirconium dichloride
1,4-butanediylbis(2-methyl-4,5-benzoindenyl)zirconium dichloride
1,2-ethanediylbis(2-methyl-4,5-benzoindenyl)zirconium dichloride
1,2-ethanediylbis(2,4,7-trimethylindenyl)zirconium dichloride
1,2-thanediylbis(2-methylindenyl)zirconium dichloride
1,4-butanediylbis(2-methylindenyl)zirconium dichloride
bis(butylcyclopentadienyl)Zr$^+$CH$_2$CHCHCH$_2$B-(C$_6$F$_5$)$_3$
bis(methylindenyl)Zr$^+$CH$_2$CHCHCH$_2$B-(C$_6$F$_5$)$_3$
dimethylsilanediylbis(2-methyl-4,5-benzoindenyl)Zr$^{30}$CH$_2$CHCHCH$_2$B-(C$_6$F$_5$)$_3$
1,2-ethanediylbis(2-methylindenyl)Zr$^+$CH$_2$CHCHCH$_2$B-(C$_6$F$_5$)$_3$
1,4-butanediylbis(2-methylindenyl)Zr$^+$CH$_2$CHCHCH$_2$B-(C$_6$F$_5$)$_3$
dimethylsilanediylbis(2-methyl-4,6-diisopropylindenyl)Zr$^+$CH$_2$CHCHCH$_2$B-(C$_6$F$_5$)$_3$
dimethylsilanediylbis(2-ethyl-4-phenylindenyl)Zr$^+$CH$_2$CHCHCH$_2$B-(C$_6$F$_5$)$_3$
dimethylsilanediylbis(2-methyl-4-phenylindenyl)Zr$^+$CH$_2$CHCHCH$_2$B-(C$_6$F$_5$)$_3$
methyl(phenyl)silanediylbis(2-methyl-4-phenylindenyl)Zr$^+$CH$_2$CH—CHCH$_2$B-(C$_6$F$_5$)$_3$
dimethylsilanediylbis(2-methyl-4-phenylindenyl)Zr$^+$CH$_2$CHCHCH$_2$B-(C$_6$F$_5$)$_3$
dimethylsilanediylbis(indenyl)Zr$^+$CH$_2$CHCHCH$_2$B-(C$_6$F$_5$)$_3$
dimethylsilanediyl(tert-butylamino)(tetramethylcyclopentadienyl)zirconium dichloride
[tris(pentafluorophenyl)(cyclopentadienylidene)borato](cyclo-pentadienyl)-1,2,3,4-tetraphenylbuta-1,3-dienylzirconium
dimethylsilanediyl[tris(pentafluorophenyl)(2-methyl-4-phenyl-indenylidene)borato](2-methyl-4-phenylindenyl)-1,2,3,4-tetra-phenylbuta-1,3-dienylzirconium
dimethylsilanediyl-[tris(trifluoromethyl)(2-methylbenzindenyl-iden)borato](2-methylbenzindenyl)-1,2,3,4-tetraphenylbuta-1,3-dienylzirconium
dimethylsilanediyl-[tris(pentafluorophethyl)(2-methyl-indenyl-iden)borato](2-methylindenyl)-1,2,3,4-tetraphenylbuta-1,3-dienylzirconium
dimethylsilanediylbis(indenyl)dimethylzirconium
dimethylsilanediylbis C$_4$-naphthylindenyl)dimethylzirconium
dimethylsilanediylbis(2-methylbenzoindenyl)dimethylzirconium
dimethylsilanediylbis(2-methylindenyl)dimethylzirconium
dimethylsilanediylbis(2-methyl-4-(1-naphthyl)indenyl)dimethylzirconium
dimethylsilanediylbis(2-methyl-4-(2-naphthyl)indenyl)dimethylzirconium
dimethylsilanediylbis(2-methyl-4-phenylindenyl)dimethylzirconium
dimethylsilanediylbis(2-methyl-4-t-butylindenyl)dimethylzirconium
dimethylsilanediylbis(2-methyl-4-isopropylindenyl)dimethylzirconium
dimethylsilanediylbis(2-methyl-4-ethylindenyl)dimethylzirconium
dimethylsilanediylbis(2-methyl-4-α-acenaphthindenyl)dimethylzirconium
dimethylsilanediylbis(2,4-dimethylindenyl)dimethylzirconium
dimethylsilanediylbis(2-ethylindenyl)dimethylzirconium
dimethylsilanediylbis(2-ethyl-4-ethylindenyl)dimethylzirconium
dimethylsilanediylbis(2-ethyl-4-phenylindenyl)dimethylzirconium
dimethylsilanediylbis(2-methyl-4,5-benzoindenyl)dimethylzirconium
dimethylsilanediylbis(2-methyl-4,6-diisopropylindenyl)dimethylzirconium
dimethylsilanediylbis(2-methyl-4,5-diisopropylindenyl)dimethylzirconium
dimethylsilanediylbis(2,4,6-trimethylindenyl)dimethylzirconium
dimethylsilanediylbis(2,5,6-trimethylindenyl)dimethylzirconium
dimethylsilanediylbis(2,4,7-trimethylindenyl)dimethylzirconium
dimethylsilanediylbis(2-methyl-5-isobutylindenyl)dimethylzirconium
dimethylsilanediylbis(2-methyl-5-t-butylindenyl)dimethylzirconium
dimethylsilanediylbis(2-methyl-4-phenanthrylindenyl)dimethylzirconium
dimethylsilanediylbis(2-ethyl-4-phenanthrylindenyl)dimethylzirconium
methyl(phenyl)silanediylbis(2-methyl-4-phenylindenyl)dimethylzirconium
methyl(phenyl)silanediylbis(2-methyl-4,6-diisopropylindenyl)dimethylzirconium methyl(phenyl)silanediylbis(2-methyl-4-isopropylindenyl)dimethylzirconium
methyl(phenyl)silanediylbis(2-methyl-4,5-benzoindenyl)dimethylzirconium
methyl(phenyl)silanediylbis(2-methyl-4,5-(methylbenzo)indenyl)dimethylzirconium
methyl(phenyl)silanediylbis(2-methyl-4,5-(tetramethylbenzo)indenyl)dimethylzirconium
methyl(phenyl)silanediylbis(2-methyl-4-α-acenaphthindenyl)dimethylzirconium
methyl(phenyl)silanediylbis(2-methylindenyl)dimethylzirconium
methyl(phenyl)silanediylbis(2-methyl-5-isobutylindenyl)dimethylzirconium
methyl(phenyl)silanediylbis(2-methyl-4-phenanthrylindenyl)dimethylzirconium
methyl(phenyl)silanediylbis(2-ethyl-4-phenanthrylindenyl)dimethyl zirconium
1,2-ethanediylbis(2-methyl-4-phenylindenyl)dimethylzirconium
1,2-butanediylbis(2-methyl-4-phenylindenyl)dimethylzirconium
1,2-thanediylbis(2-methyl-4,6-diisopropylindenyl)dimethylzirconium
1,4-butanediylbis(2-methyl-4-isopropylindenyl)dimethylzirconium
1,4-butanediylbis(2-methyl-4,5-benzoindenyl)dimethylzirconium
1,2-ethanediylbis(2-methyl-4,5-benzoindenyl)dimethylzirconium
1,2-ethanediylbis(2,4,7-trimethylindenyl)dimethylzirconium
1,4-butanediylbis(2-methylindenyl)dimethylzirconium Pariticular preference is given to:
dimethylsilanediylbis(2-methylindenyl)zirconium dichloride
dimethylsilanediylbis(2-methyl-4-(1-naphthyl)indenyl)zirconium dichloride
dimethylsilanediylbis(2-methyl-4-phenylindenyl)zirconium dichloride
dimethylsilanediylbis(2-methyl-4-(p-tert-butylphenyl)indenyl)zirconium dichloride
dimethylsilanediylbis(2-methyl-4-α-acenaphthindenyl)zirconium dichloride
dimethylsilanediylbis(2-ethyl-4-phenylindenyl)zirconium dichloride
dimethylsilanediylbis(2-methyl-4,5-benzoindenyl)zirconium dichloride
dimethylsilanediylbis(2-methyl-4,6-diisopropylindenyl)zirconium dichloride
dimethylsilanediylbis(2-methyl-4-phenanthrylindenyl)zirconium dichloride
dimethylsilanediylbis(2-ethyl-4-phenanthrylindenyl)zirconium dichloride
methyl(phenyl)silanediylbis(2-methyl-4-phenanthrylindenyl)zirconium dichloride
methyl(phenyl)silanediylbis(2-ethyl-4-phenanthrylindenyl)zirconium dichloride Methods of preparing metallocenes of the formula I are described, for example, in Journal of Organometallic Chem. 288 (1985) 63–67 and the documents cited therein.

As cocatalyst component B), the catalyst system of the present invention usually further comprises open-chain or cyclic aluminoxane compounds and/or other compounds B) capable of forming metallocenium ions. These can be Lewis acids and/or ionic compounds having noncoordinating anions.

The aluminoxane compounds are usually described by the formula II or III

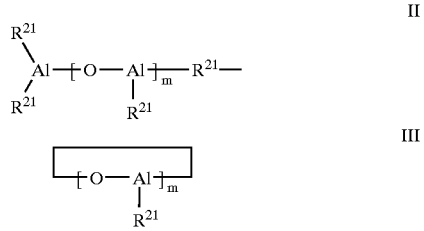

where
$R^{21}$ is a $C_1$–$C_4$-alkyl group, preferably a methyl or ethyl group, and m is an integer from 5 to 30, preferably from 10 to 25.

The preparation of these oligomeric aluminoxane compounds is usually carried out by reacting a solution of trialkylaluminum with water and is described, for example, in EP-A 284 708 and U.S. Pat. No. 4,794,096.

In general, the oligomeric aluminoxane compounds obtained are in the form of mixtures of both linear and cyclic chain molecules of various lengths, so that m is to be regarded as a mean. The aluminoxane compounds can also be present in admixture with other metal alkyls, preferably aluminum alkyls.

Further compounds which can be used as component B) are aryloxyaluminoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279 or mixtures thereof.

As Lewis acid, preference is given to using at least one organoboron or organoaluminum compound containing $C_1$–$C_{20}$ groups such as branched or unbranched alkyl or haloalkyl, e.g. methyl, propyl, isopropyl, isobutyl, trifluoromethyl, unsaturated groups such as aryl or haloaryl, e.g. phenyl, tolyl, benzyl, p-fluorophenyl, 3,5-difluorophenyl, pentachlorophenyl, pentafluorophenyl, 3,4,5-trifluorophenyl and 3,5-di(trifluoromethyl)phenyl.

Particular preference is given to organoboron compounds. Examples of Lewis acids are trifluoroborane, triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-dimethylfluorophenyl)borane and/or tris(3,4,5-trifluorophenyl)borane. Particular preference is given to tris(pentafluorophenyl)borane.

Well-suited ionic compounds which contain a noncoordinating anion are, for example, tetrakis(pentafluorophenyl)borate, tetraphenylborate, $SbF_6^-$, $CF_3SO_3^-$ or $ClO_4^-$. As cationic counterion, use is generally made of Lewis bases such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline, triethylphosphine, triphenylphosphine, diphenylphosphine, tetrahydrothiophene and triphenylcarbenium.

Examples of such ionic compounds which have noncoordinating anions and can be used for the purposes of the present invention are
triethylammonium tetra(phenyl)borate,
tributylammonium tetra(phenyl)borate,
trimethylammonium tetra(tolyl)borate,
tributylammonium tetra(tolyl)borate, tributylammonium tetra(pentafluorophenyl)borate,
tributylammonium tetra(pentafluorophenyl)aluminate,
tripropylammonium tetra(dimethylphenyl)borate,
tributylammonium tetra(trifluoromethylphenyl)borate,
tributylammonium tetra(4-fluorophenyl)borate,
N,N-imethylanilinium tetra(phenyl)borate,
N,N-diethylanilinium tetra(phenyl)borate,
N,N-dimethylanilinium tetrakis(pentafluorophenyl)borate,
N,N-dimethylanilinium tetrakis(pentafluorophenyl) aluminate,
di(propyl)ammonium tetrakis (pentafluorophenyl)borate,
di(cyclohexyl)ammonium tetrakis(pentafluorophenyl) borate,
triphenylphosphonium tetrakis(phenyl)borate,
triethylphosphonium tetrakis(phenyl)borate,
diphenylphosphonium tetrakis(phenyl)borate,
tri(methylphenyl)phosphonium tetrakis(phenyl)borate,
tri(dimethylphenyl)phosphonium tetrakis(phenyl)borate,
triphenylcarbenium tetrakis(pentafluorophenyl)borate,
triphenylcarbenium tetrakis(pentafluorophenyl)aluminate,
triphenylcarbenium tetrakis(phenyl)aluminate,
ferrocenium tetrakis(pentafluorophenyl)borate and/or
ferrocenium tetrakis(pentafluorophenyl)aluminate.

Preference is given to triphenylcarbenium tetrakis (pentafluorophenyl)borate and/or N,N-dimethylanilinium tetrakis(pentafluorophenyl)borate.

It is also possible to use mixtures of at least one Lewis acid and at least one ionic compound.

Further use for cocatalyst components are borane or carborane compounds such as
7,8-dicarbaundecaborane(13),
undecahydrido-7,8-dimethyl-7,8-dicarbaundecaborane,
dodecahydrido-1-phenyl-1,3-dicarbaundecaborane,
tri(butyl)ammonium decahydrido-8-thyl-7,9-dicarbaundecaborate,
4-carbanonaborane(14),
bis(tri(butyl)ammonium) nonaborate,
bis(tri(butyl)ammonium) undecaborate,
bis(tri(butyl)ammonium) dodecaborate,
bis(tri(butyl)ammonium) decachlorodecaborate,
tri(butyl)aamonium 1-carbadecaborate,
tri(butyl)ammonium 1-carbadodecaborate,
tri(butyl)ammonium 1-trimethylsilyl-1-carbadecaborate,
tri(butyl)ammonium bis(nonahydrido-1,3-dicarbanonaborato)cobaltate(III),
tri(butyl)ammonium bis(undecahydrido-7,8-dicarbaundecaborato)ferrate(III)

The support component C) of the catalyst system used according to the present invention can be any organic or inorganic, inert solid, in particular a porous support such as talc, inorganic oxides and finely divided polymer powder (e.g. polyolefins).

Suitable inorganic oxides are those of elements of groups 2, 3, 4, 5, 13, 14, 15 and 16 of the Periodic Table of the Elements. Examples of oxides preferred as supports include silicon dioxide, aluminum oxide and also mixed oxides of the two elements and corresponding oxide mixtures. Other inorganic oxides which can be used alone or in combination with the last-named preferred oxidic supports are, for example, MgO, $ZrO_2$, $TiO_2$ or $B_2O_3$, to name only a few.

Organic support materials are, for example, finely divided polyolefin powders (e.g. polyethylene, polypropylene or polystyrene).

The support materials used, in particular the inorganic oxides, generally have a specific surface area in the range from 10 to 1000 $m^2$/g, a pore volume in the range from 0.1 to 5 ml/g and a mean particle size of from 1 to 500 mm.

Preference is given to supports having a specific surface area in the range from 50 to 500 $m^2$/g, a pore volume in the range from 0.5 to 3.5 ml/g and a mean particle size in the range from 5 to 350 mm. Particular preference is given to supports having a specific surface area in the range from 200 to 400 $m^2$/g, a pore volume in the range from 0.8 to 3.0 ml/g and a mean particle size of from 10 to 200 mm.

The preparation of the supported catalyst is generally not critical. Useful variants are the following:

In variant 1, in general at least one metallocene component A), usually in an organic solvent, is brought into contact with the cocatalyst component B) to give a dissolved or partly suspended product. This product is then generally added to the support material, which may have been pre-treated as described above, preferably porous silicon dioxide (silica gel), the solvent is removed and the supported catalyst is obtained as a free-flowing solid. The supported catalyst can then be additionally prepolymerized, for example using $C_2$–$C_{10}$-alk-l-enes.

In variant 2, the supported metallocene catalyst is generally obtained by means of the following process steps
a) reaction of an inorganic support material, preferably porous silicon dioxide as described above, with a passivating agent, as described above, preferably a tri-$C_1$–$C_{10}$-alkylaluminum such as trimethylaluminum, triethylaluminum or triisobutylaluminum,
b) reaction of the material obtained in this way with a metallocone complex A), preferably a metallocone complex of the formula I, in fine metal dihaldide form and a compound B) capable of forming metallocenium ions, and subsequent
c) reaction with an organometallic compound of an alkali metal, alkali earth metal or element of main group III, preferably a tri-$C_1$–$C_{10}$-alkylaluminum such as trimethylaluminum, triethylaluminum or triisobutylaluminum.

This process is described in detail in DE-A 19 606 197, which is hereby expressly incorporated by reference.

As additive, a small amount of an olefin, preferably a 1-olefin such as 1-hexene or styrene, as activity-promoting component or an antistatic can be added during or after the preparation of the supported catalyst system. The molar ratio of additive to metallocene component (compound I) is preferably from 1:1000 to 1000:1, very particularly preferably from 1:20 to 20:1.

The supported catalyst system prepared according to the present invention can either be used directly for the polymerization of olefins or can be prepolymerized using one or more olefinic monomers before it is used in a polymerization process. The method of carrying out the prepolymerization of supported catalyst systems is described in WO 94/28034.

The polymers of the present invention can advantageously be converted into fibers, films and moldings.

The moldings, in particular the tubes, can be advantageously used in the construction of chemical apparatus, as drinking water pipes or as wastewater pipes.

Furthermore, the moldings comprising the propylene polymers of the present invention can be used for producing semifinished parts (examples are rods, plates, fittings, profiles, e.g. via an injection-molding process) or blow-molded containers or air conduits in the motor vehicle sector.

EXAMPLES

The following examples illustrate the invention. To characterize the products produced, the following polymer analysis methods were used:

30 Melt flow rate MFR (230/5) in accordance with ISO 1133 viscosity number [ml/g] determined at 135° C. in decalin

Creep rupture strength (CRS) in accordance with ISO 1167

Impact toughness of a tube in accordance with DIN 8078

$n_{iso}$=mean length of the isotactic sequences; determined by $^{13}$C-NMR spectroscopy (see Zambelli et al., Macromolecules 8, 687–689(1975))

Proportion of xylene-soluble material (in % by weight)

A polymer sample was completely dissolved in boiling xylene and the mixture was allowed to cool to 20° C. The insoluble material was filtered off, dried to constant weight and weighed. The ratio of the weight of polymer obtained after drying to the weight of polymer used at the beginning was calculated as a percentage.

Example A

Preparation of a supported catalyst system (catalyst 1)

22.2 g (3.55 mmol) of rac-dimethylsilanediylbis(2-methyl-4-phenylindenyl)zirconium dichloride were dissolved at room temperature in 177.5 ml (640 mmol of Al) of 30% strength methylaluminoxane solution in toluene. For preactivation, the mixture was allowed to stand in the absence of light at 25° C. for 18 hours. The metallocene-MAO solution prepared in this way was subsequently diluted with 434.5 ml of toluene to a total volume of 612 ml. 153 g of $SiO_2{}^1$) were slowly introduced into this solution. The ratio of the volume of solution to the total pore volume of the supportmaterial was 2.5. After the addition was complete, the mixture was stirred at room temperature for 5 minutes. The mixture was subsequently evaporated to dryness at 40° C. under reduced pressure over a period of 2 hours and the residue was dried at 25° C. and $10^{-3}$ bar for 5 hours. This gave 201 g of a free flowing pink powder which, according to elemental analysis, contained 0.14% by weight of Zr and 8.1% by weight of Al.

1) Silica grade MS 948, W. R. Grace, Davison Chemical Division, Baltimore, Md., USA, pore volume 1.6 ml/g, calcined at 800° C.

Example 1

A 70 liter reactor was, after carefully having been made inert, charged with 10 liters of liquid propylene at 30° C. 10 mmol of triisobutylaluminum were added and the mixture was stirred at 30° C. for 15 minutes. 5250 mg of catalyst 1 were subsequently added and, in a further step, 2.21 standard 1 of $H_2$ were introduced.

The contents of the reactor were heated to 70° C. while stirring and the polymerization commenced. The temperature was kept constant at 70° C. for one hour. The contents of the reactor were worked up by venting.

7.5 kg of PP were obtained, from which a catalyst yield of 1.4 kg of PP/g of cat. can be calculated. An MFR (230/5) of 0.34 dg/min was determined. The proportion of xylene-soluble material was determined as 0.3% by weight. The proportion of acetone-soluble material was determined as 0.05% by weight.

Comparative Example 1

The procedure of Example 1 was repeated, but 3.4 standard 1 of $H_2$ were introduced. 5250 mg of catalyst 1 were used. 8.5 kg of PP were obtained, from which a catalyst yield of 1.6 kg of PP/g of cat. could be calculated. An MFR (230/5) of 0.9 dg/min was determined on a sample.

Example 2

In a further experiment, the procedure of Example 1 was repeated, but a polymerization temperature of 50° C. was selected. 7670 mg of catalyst 1 were subsequently added. No hydrogen was introduced.

2.4 kg of PP were obtained, from which a catalyst yield of 0.3 kg of PP/g of cat. could be calculated. An MFR (230/5) of 0.16 dg/min was determined on a sample. The viscosity number was 696 ml/g.

Example 3

In a further experiment, the procedure of Example 2 was repeated.

7670 mg of catalyst 1 and 23.1 standard 1 of $H_2$ were used. The addition sequence was as in Example 1.

5.3 kg of PP were obtained, from which a catalyst yield of 0.7 kg of PP/g of cat. could be calculated. An MFR (230/5) of 35.3 dg/min was determined on a sample. The viscosity number was 202 ml/g.

Example 4

In a further experiment, the procedure of Example 2 was repeated.

8400 mg of catalyst 1 were added. No hydrogen was initially introduced.

The polymerization time was extended to 90 minutes, after which 23.1 standard 1 of $H_2$ were introduced. The polymerization was continued for a further 18 minutes at the same temperature.

12 kg of PP were obtained, from which a catalyst yield of 1.7 kg of PP/g of cat. could be calculated. An MFR (230/5) of 0.86 dg/min was determined on a sample. The viscosity number was 468 ml/g.

The melting point was 152.1° C.; the heat of fusion was 96.3 J/g.

The proportion of xylene-soluble material was determined as 0.3% by weight.

The proportion of acetone-soluble material was determined as 0.05% by weight.

The triad distribution (mm; mr; rr) was determined by NMR spectroscopy:

From these data, the isotactic sequence length niso was calculated as 76.

Example 5

In a further experiment, the procedure of Example 4 was repeated.

3910 mg of catalyst 1 were added, no hydrogen was introduced initially.

The polymerization time was extended to 120 minutes, after which 29.9 standard 1 of $H_2$ were introduced. The polymerization was continued for a further 30 minutes at the same temperature.

12.9 kg of PP were obtained, from which a catalyst yield of 3.3 kg of PP/g of cat. could be calculated. An MFR (230/5) of 1.9 dg/min was determined on a sample. The viscosity number was 417 ml/g.

The proportion of xylene-soluble material was determined as 0.2% by weight.

The proportion of acetone-soluble material was determined as 0.05% by weight.

The melting point was 149.9° C.; the heat of fusion was 96.6 J/g.

Example 6

In a further experiment, the procedure of Example 5 was repeated.

2890 mg of catalyst 1 were added. 3.4 standard 1 of hydrogen were introduced initially.

The polymerization time was set to 60 minutes, after which 26 standard 1 of $H_2$ were added. The polymerization was continued for a further 48 minutes at the same temperature.

11.9 kg of PP were obtained, from which a catalyst yield of 4.1 kg PP/g of cat. could be calculated. An MFR (230/5) of 3.9 dg/min was determined on a sample.

Example 7

50 liters of liquid propylene were placed in the reactor at 30° C. For preactivation, 10 mmol of triisobutylaluminum were added and the mixture was stirred at 30° C. for 15 minutes. 5878 mg of catalyst 1 were subsequently added and, in a further step, 0.2 standard 1 of $H_2$ were introduced.

The contents of the reactor were heated to 70° C. and the polymerization started. After 10 minutes, the contents of the reactor were carefully depressurized to a pressure of 25 bar. 3 standard 1 of hydrogen were subsequently added. Polymerization was continued for 1 hour in the gas phase while stirring. The pressure was kept constant at 25 bar by addition of propylene.

After one hour, 30 standard 1 of hydrogen were introduced, resulting in a presure rise to 27 bar.

Polymerization was continued for 1 hour in the gas phase while stirring.

The pressure was kept constant at 27 bar by addition of propylene.

12.4 kg of PP were obtained, from which a catalyst yield of 3.4 kg of PP/g of cat. could be calculated. An MFR (230/5) of 3.9 dg/min was determined on a sample.

Example 8

50 liters of liquid propylene were placed in the reactor at 30° C. For preactivation, 10 mmol of triisobutylaluminum were added and the mixture was stirred at 30° C. for 15 minutes.

5878 mg of catalyst 1 were subsequently added and, in a further step, 2.2 standard 1 of $H_2$ were introduced.

The contents of the reactor were heated to 70° C. and the polymerization started. Polymerization was continued for 1 hour while stirring. The temperature was kept constant by means of jacket cooling.

After one hour, the contents of the reactor were carefully depressurized to a pressure of 25 bar; 30.5 standard 1 of hydrogen were introduced, resulting in a pressure rise to 27 bar.

Polymerization was continued for 1 hour in the gas phase while stirring.

The pressure was kept constant at 27 bar by addition of propylene.

10.4 kg of PP were obtained, from which a catalyst yield of 2.8 kg of PP/g of cat. could be calculated. An MFR (230/5) of 2.8 dg/min was determined on a sample.

Example 9

Polymerization was carried out continuously in two stirred reactors, each having a capacity of 16 l, connected in series. Both reactors were charged with 10 l of liquid propylene. As cocatalyst, use was made of triisobutylaluminum in a concentration of 1 mmol/l. The hydrogen concentration in the liquid phase was set to 50 ppm by volume.

In the first reactor, a mixture of propylene was polymerized at 50° C. in the presence of the abovementioned catalyst 1. A further catalyst, cocatalyst, propylene and hydrogen were continuously metered in. The polymerization was operated at a solids content of 224 g of PP per liter of suspension. This corresponds to a phase ratio of 3.3 l of liquid propylene per kg of PP. Further hydrogen was metered in so that a concentration of 50 ppm by volume was established in the liquid phase.

The PP obtained in the first reactor was, together with the catalyst, transferred to the second reactor. In the second reactor, further hydrogen and propylene were metered in. The $H_2$ concentration in the liquid phase was 410 ppm by volume. The reaction temperature in the second reactor was likewise 50° C. The polymerization was operated at a solids content of 324 g of PP per liter of suspension. This corresponds to a phase ratio of 1.9 l of liquid propylene per kg of PP.

The reaction product was continuously transferred from the reactor 2 to a flash vessel operated at 70° C. and a pressure of 0.4 bar. The polymer was taken periodically from the flash vessel.

A catalyst yield of 5 kg of PP/g of catalyst was obtained. A molar mass distribution $M_w/M_n$ of 6.0, an MFR of 1.2 dg/min and a viscosity number of 550 ml/g were measured. The proportion of xylene-soluble material was measured as 0.5% by weight.

Example 10

Propylene was polymerized in a polymerization plant to give PP. The catalyst (1) and triisobutylaluminum were mixed with one another and continuously prepolymerized in liquid propylene in a prepolymerization reactor. The mixture of catalyst, triisobutylaluminum, propylene and polypropylene was metered into the first reactor. In addition, propylene was fed from a reservoir to the first reactor. Hydrogen was dissolved in the liquid propylene and then introduced into the reactor by means of this stream. A concentration of 60 ppm of hydrogen was set in the liquid propylene. 17 t/h of propylene were fed to the first reactor. In the reactor, propylene was converted into PP in the presence of catalyst 1. The reaction mixture was taken continuously from the first reactor and metered into the second reactor. In the second reactor, a further 7 t/h of propylene were introduced. A concentration of 420 ppm of hydrogen was set in this propylene stream. After passing through the second reactor, the reaction mixture was worked up in a stirred vessel by depressurization to 18 bar and the PP and the gaseous components were separated from one another. The gaseous propylene was condensed, distilled and subsequently returned to the reservoir. Per liter of liquid propylene fed to the first reactor, 0.9 mmol of aluminum alkyl and 80 mg of catalyst were metered in.

In the first reactor, a phase ratio of 3.3 l of liquid propylene per kg of PP was set; in the second reactor, a phase ratio of 1.9 l of liquid propylene per kg of PP was set. The ratio of the quantities of heat removed from the reactors was 1.4:1 (1st reactor/2nd reactor). The PP product obtained had a polydispersity $M_w/M_n$ of 7.0 and an MFR (230/5) of 0.9 dg/min.

Example 11

The powder obtained from Example 4 was granulated at about 240° C. under inert gas using a twin-screw extruder having a screw diameter of 53 mm. During granulation, 0.15% of ®Irganox 1010 and 0.15% of ®Hostanox PAR 24 were added as stabilizers. In addition, a color mixture was added. The $M_w/M_n$ was determined on the granulated material obtained, giving a value of 6.0.

Comparative Example 2

The powder obtained from Comparative Example 1 was granulated at about 240° C. under inert gas using a twin-screw extruder having a screw diameter of 53 mm. During granulation, 0.15% of ®Irganox 1010 and 0.15% of ®Hostanox PAR 24 were added as stabilizers. In addition, a color mixture was added. The $M_w/M_n$ was determined on the granulated material obtained, giving a value of 3.8.

The granulated material obtained in this way was processed on a tube extrusion plant comprising a 60 mm grooved-barrel extruder and a vacuum spray tank to give tubes having dimensions of 32×4.5 mm (internal diameter= 32 mm, wall thickneess=4.5 mm). The melt throughput was 150 kg/h and the melt temperature was set to 210° C. The tube surface was very rough.

Example 12

The powder obtained from Example 4 was granulated at about 240° C. under inert gas using a twin-screw extruder having a screw diameter of 53 mm. During granulation, 0.2% of ®Irganox 1010 and 0.2% of ®Hostanox PAR 24 were added as stabilizers. The $M_w/M_n$ was determined on the granulated material obtained, giving a value of 6.0. The melt flow rate MFR 230/2.16 (in accordance with ISO 1133) was 0.25 dg/min.

Example 13

Tensile bars (test specimens type 1A in accordance with ISO 527, Part 1) for determining physical property values were produced from granulated material from Example 12 on an injection molding machine.

Furthermore, tubes having dimensions of 32×3 mm (internal diameter=32 mm, wall thickness=3 mm) were produced from the granulated material from Example 12 on a tube extrusion plant comprising a 60 mm grooved-barrel extruder and a vacuum spray tank. The melt throughput was 150 kg/h and the melt temperature was set to 210° C.

The following material properties were determined:
Tensile test in accordance with ISO 527, Parts 1 and 2
Charpy impact toughness in accordance with ISO 179/1eU
Notched impact toughness in accordance with ISO 179/1eA
DSC by internal Targor method
Long-term pressure test in accordance with ISO 1167, requirements in accordance with DIN 8078
Impact toughness on a tube in accordance with DIN 8078

The results from the tensile test, the toughness tests and the DSC determination were compared with values determined on a granulated material having a narrow molar mass distribution. The test specimens were in both cases produced under conditions which met the requirements of ISO DIN 1873, Part 2.

It was found that the physical property values for Example 13 compared to Comparative Example 2 $M_w/M_n$= 3.8 indicated a higher stiffness at the same toughness. The crystallite melting point was from 10 to 15° C. lower than in the case of conventional PP grades, which brought significant advantages in processing (lower energy uptake by the machines).

Tube:

It was found that processing proceeded very uniformly and the tube surface was very smooth both inside and outside. The quality of the tube surface was characterized by comparing it with tubes produced from a granulated material having a narrow molar mass distribution (cf. Comparative Example 2 $M_w/M_n$=3.8) on the same tube extrusion plant under identical conditions.

The impact toughness of the tubes was good and corresponded to the requirements of DIN 8078, Subclause 3.5. The tubes were subjected to various long-term pressure tests in accordance with the requirements of DIN 8078:

| Test temperature | Test pressure | Minimum time before rupture (Specified) | Achieved time before rupture |
| --- | --- | --- | --- |
| 95 | 3.5 N/mm² | 1000 h | = 11155 h Test complete |

The minimum times before rupture prescribed for PP-H in DIN 8078 (PP tubes) were exceeded substantially. The tubes have very good creep rupture behavior and a smooth surface. The impact toughness specification for PP-H in accordance with DIN 8078 was met by the tube.

Example 14

The powder obtained from Example 5 was granulated at about 240° C. under inert gas using a twin-screw extruder having a screw diameter of 53 mm. During granulation, 0.2% of ®Irganox 1010 and 0.2% of ®Hostanox PAR 24 were added as stabilizers. The $M_w/M_n$ was determined on the granulated material obtained, giving a value of 5.9. The melt flow rate MFR 230/2.16 (in accordance with ISO 1133) was 0.49 g/min.

Example 15

Tensile bars (test specimens type 1A) for determining physical property values were produced from granulated material from Example 14 on an injection molding machine.

Furthermore, tubes having dimensions of 32×3 mm (internal diameter=32 mm, wall thickness=3 mm) were produced from the granulated material from Example 14 on a tube extrusion plant comprising a 60 mm grooved-barrel extruder and a vacuum spray tank. The melt throughput was 150 kg/h and the melt temperature was set to 210° C.

The following material properties were determined:
Long-term pressure test in accordance with ISO 1167, requirements in accordance with DIN 8078
Impact toughness on the tube in accordance with DIN 8078

The test specimens were in both cases produced under conditions corresponding to the requirements of ISO DIN 1873, Part 2.

Tube:

It was found that processing proceeded very uniformly and the tube surface was very smooth both inside and outside. The quality of the tube surface was characterized by comparing it with tubes produced from a granulated material having a narrow molar mass distribution (cf. Comparative Example 2 $M_w/M_n$=3.8) on the same tube extrusion plant under identical conditions.

The impact toughness of the tubes was good and corresponded to the requirements of DIN 8078, Subclause 3.5. The tubes were subjected to various long-term pressure tests in accordance with the requirements of DIN 8078:

| Test temperature | Test pressure | Minimum time before rupture (Specified) | Achieved time before rupture |
|---|---|---|---|
| 95 | 3.5 N/mm$^2$ | 1000 h | = 11443 h Test complete |

The minimum times before rupture prescribed for PP-H in DIN 8078 (PP tubes) were exceeded very substantially. The tubes had very good creep rupture behavior and a very smooth surface. The impact toughness specification for PP-H in accordance with DIN 8078 was met by the tube.

Example 16

The granulated material obtained from Example 4 was subjected to an aqueous extraction. For this purpose, 8 g of the granules were placed in a cleaned conical flask and 250 ml of odor- and taste-free water (e.g. mains water) were added. The sample was extracted for 4 hours on a water bath heated to 70° C. while stirring by means of a magnetic stirrer. The extraction solution was decanted into a clean conical-shoulder bottle which had been rinsed with mains water. After cooling to 25° C., dilution series were prepared from the test water. On these, the odor threshold value (OT) and the taste threshold value (TT) were determined by a test panel in accordance with prEN 1420-1 (1994-08).

An odor threshold value (OT)=1 and a taste threshold value (TT)=1 were determined, i.e. the test water is odor- and taste-free compared to the comparison water.

The extruded tube obtained from Example 12/13 (metallocene PP) was subjected to an aqueous extraction by closing the tube and filling it with odor- and taste-free water (e.g. mains water). The water remained static in the tube for 72 hours at 23° C. and was then placed in a clean conical-shoulder bottle which had been rinsed with mains water. The contact experiment was repeated three times, so that three samples of migration water were obtained On these, the odor threshold value (OT) and the taste threshold value (TT) were determined by a test panel in accordance with prEN 1420-1 (1994-08).

An odor threshold value (OT)=1–2 and a taste threshold value (TT)=1–2 were determined on the 1st extraction.

On the 2nd and 3rd extractions, an odor threshold value (OT)=1 and a taste threshold value (TT)=1 were determined, i.e. the test water was odor- and taste-free compared to the comparison water.

Comparative Example 3

The granulated material prepared in Comparative Example 2 was subjected to the same test as in Example 16 (paragraph 1). An odor threshold value (OT)=8 and a taste threshold value (TT)=4–8 were determined. Thus, the water had a clearly perceptible odor and taste compared to the comparison water.

The tube from Comparative Example 2 was subjected to an aqueous extraction as in Example 16. An odor threshold value (OT)=8 and a taste threshold value (TT)=4–8 were determined on the first extraction.

On the 2nd and 3rd extraction, an odor threshold value (OT)=4–8 and a taste threshold value (TT)=4 were determined, i.e. all 3 extractions had a clearly perceptible odor and taste compared to the comparison water.

Example 17

The tube obtained in Example 12/13 was subjected to an assessment of the odor behavior when heated. The test was carried out in accordance with the VDA guideline 270 (VDA=Verband der deutschen Automobilindustrie [Association of the German Automobile Industry]). For this purpose, pieces of tube having a material volume of 50 cm$^3$ were placed in a clean and odor-free 1 l glass vessel which was closed using an odor-neutral seal and lid. The specimen was subsequently stored for 2 hours at 80° C. in an oven. The test vessel was taken from the oven and then cooled to a test room temperature of 60° C. before the odor assessment was carried out.

The following evaluation scale was employed:

Grade 1 not perceptible

Grade 2 perceptible, not bothersome

Grade 3 clearly perceptible, but not bothersome

Grade 4 bothersome

Grade 5 very bothersome

Grade 6 unbearable (Intermediate half grades can also be awarded)

The pipe pieces tested were given the Grade 1. Thus, no odor was perceptible.

Comparative Example 4

Pipe pieces from Comparative Example 3 were subjected to the odor test as in Example 16. The grade determined was 4–5.

Example 18

Production of extruded boards

The extruded board was produced from the thermoplastic molding composition in a manner known per se by extrusion. For this purpose, the polymer described in Example 12 was melted and homogenized at about 170–250° C. in an extruder and extruded through a slit die to produce an extrudate having a width and a thickness corresponding to the board. Cooling and taking-off were carried out on a three-roll polishing unit and a subsequent roller track in the manner customary for polyolefins. The continuously produced sheet was then cut laterally and to length.

Slabs and boards having a thickness of 50 mm were produced.

The boards obtained in this way had the following properties.

Smooth glossy surface Tensile E modulus in accordance with ISO 527/2=1490 MPa Charpy notched impact toughness at 23° C., ISO 179/leA=9.8 kJ/m$^2$ Production of a solid rod Solid rods were used as semifinished parts for further machining. The solid rods were produced from the granulated material obtained in Example 12 by extrusion in a continuous process. The granulated material was melted in an extruder at 170–250° C. The melt was then initially cooled intensively at the circumference in a calibrating tube and subsequently cooled in a thermostated water bath until the solid rod had become sufficiently rigid.

Solid rods having a diameter of 500 mm were produced.

The solid rods obtained in this way had the following properties:

Low residual stress Tensile E modulus in accordance with ISO 527/2=1520 MPa (measured on test specimens cut out on a milling machine) Charpy notched impact toughness at 23° C., ISO 179/leA=9.6 kJ/m²

Production of a pressed slab

Pressed slabs having a thickness of 50 mm were produced from the granulated material obtained from Example 2.

Owing to the lower melting point, the pressed slabs could be produced using a shorter heating time. For example, in the case of a 50 mm thick pressed slab, the heating time was reduced from 240 minutes to 200 minutes.

The pressed slabs obtained in this way had the following properties:

Low residual stress Tensile E modulus in accordance with ISO 527/2=1480 MPa (measured on test specimens cut out on a milling machine) Charpy notched impact toughness at 23° C., ISO 179/leA=9.7 kJ/m²

Example 19

The procedure of Example 18 was repeated, but the granulated material from Example 14 was used.

The extruded boards obtained had the following properties:

Smooth glossy surface Tensile E modulus in accordance with ISO 527/2=1560 MPa Charpy notched impact toughness at 23° C., ISO 179/leA=9.5 kJ/m²

The solid rods obtained had the following properties:

Low residual stress Smooth glossy surface Tensile E modulus in accordance with ISO 527/2=1530 MPa Charpy notched impact toughness at 23° C., ISO 179/leA=9.6 kJ/m²

The pressed slabs obtained had the following properties:
Low residual stress smooth glossy surface Tensile E modulus in accordance with ISO 527/2=1540 MPa Charpy notched impact toughness at 23° C., ISO 179/leA=9.3 kJ/m².

What is claimed is:

1. A propylene polymer containing from 0 to 2.5% by weight of $C_2$–$C_{10}$-olefin comonomers and having an $M_w$ of from 350,000 to 1,000,000 g/mol, and $M_w/M_n$ of from 4 to 10, a proportion by weight of the polymer fraction having a viscosity number of from 500 to 1400 ml/g of from 20 to 80% of the total polymer and a proportion by weight of a polymer fraction having a viscosity number of from 200 to 400 ml/g of from 20 to 80% of the total polymer and a mean isotactic sequence length of from 50 to 100, obtained by polymerization of the monomers in the presence of a catalyst system comprising a metallocene as transition metal component.

2. A propylene homopolymer as claimed in claim 1.

3. A fiber, film or molding comprising a propylene polymer as claimed in claim 1.

4. A molding as claimed in claim 3 which is a tube, plate or semifinished part.

5. A molding as claimed in claim 3 which is in form of a hollow body.

6. A chemical apparatus comprising the propylene polymer defined in claim 1.

7. A drinking water pipe comprising the propylene polymer defined in claim 1.

8. A wastewater pipe comprising the propylene polymer defined in claim 1.

* * * * *